(12) United States Patent
Jung

(10) Patent No.: US 7,946,107 B2
(45) Date of Patent: May 24, 2011

(54) MIXTURE RATIO STABILIZER FOR LIQUID PROPELLANT ROCKET ENGINE

(75) Inventor: Tae Kyu Jung, Daejeon (KR)

(73) Assignee: Korea Aerospace Research Institute, Daejeon (KR)

( * ) Notice: Subject to any disclaimer, the term of this patent is extended or adjusted under 35 U.S.C. 154(b) by 736 days.

(21) Appl. No.: 11/965,551

(22) Filed: Dec. 27, 2007

(65) Prior Publication Data

US 2010/0043392 A1 Feb. 25, 2010

(30) Foreign Application Priority Data

Aug. 6, 2007 (KR) ................. 10-2007-0078637

(51) Int. Cl.
*F02K 9/00* (2006.01)
(52) U.S. Cl. .......................... 60/243; 60/257
(58) Field of Classification Search ............ 60/39.27, 60/39.281, 240, 243, 257; 137/596.18; 251/61, 251/61.2, 61.3, 61.4, 61.5
See application file for complete search history.

(56) References Cited

U.S. PATENT DOCUMENTS

| 3,206,927 A | * | 9/1965 | Heinz | 60/243 |
| 3,568,447 A | * | 3/1971 | Paine | 60/243 |
| 3,726,302 A | * | 4/1973 | Lawsing | 137/115.05 |

* cited by examiner

*Primary Examiner* — Louis Casaregola
(74) *Attorney, Agent, or Firm* — Rabin & Berdo, PC

(57) ABSTRACT

There is provided a mixture ratio stabilizer for a liquid propellant rocket engine which comprises: a body internally having a chamber and a fuel supply hole communicating with an end of the chamber to receive fuel from a fuel supply pump, an oxidizer inlet, and a fuel outlet; a spool guide in the chamber and including a plurality of first orifices for the fuel outlet and the fuel supply hole to communicate with each other; a bellows in the chamber and having one end adjacent to the spool guide and the other end positioned adjacent to the oxidizer inlet, to expand and contract in accordance with the pressure of an oxidizer which flows into the oxidizer inlet; and a spool having a part placed in the spool guide.

6 Claims, 4 Drawing Sheets

MIXTURE RATIO STABILIZER FOR LIQUID PROPELLANT ROCKET ENGINE

CROSS-REFERENCE TO RELATED PATENT APPLICATION

The present application claims priority under 35 U.S.C. 119 to Korean Patent Application No. 10-2007-0078637 (filed on Aug. 6, 2007), which is hereby incorporated by reference in its entirety.

FIELD OF THE INVENTION

Embodiments relates to a mixture ratio stabilizer for a liquid propellant rocket engine which is able to considerably reduce the size and weight thereof.

DESCRIPTION OF RELATED ARTS

Generally, a liquid propellant rocket engine preserves oxygen inside thereof contrary to other gears such as a turbojet, a ramjet propellant unit, etc., and obtains its thrust in accordance with the principle of action and reaction by mixing and burning a liquid oxidizer in a burner and jetting out exhaust through a nozzle. Such a rocket engine can easily control a volume of combustion using its valve and pump. In addition, since it is easy to ignite the oxidizer over again, it is more preferred rather than a solid-type engine.

A liquid propellant rocket engine according to the related art was introduced in Korean Patent No. 0654412. As shown in FIG. 4, a mixture ratio stabilizer 200 used for a liquid propellant rocket engine includes a body 210, a spool guide 220, a diaphragm 230, and a spool 240.

However, the mixture ratio stabilizer has a problem, in which in order for the diaphragm to separate an oxidizer from fuel, the diaphragm should be made extremely thin and have a large diameter for the spool connected with the diaphragm to move freely.

Accordingly, the area of a body which receives pressure becomes large and therefore the load taken by the pressure also increases so that the body should be very thick, thereby increasing the weight of the mixture ratio stabilizer.

In addition, the rocket engine may have a problem in its stability because it is difficult to cope with external troubles such as sudden change in pressure.

SUMMARY OF THE INVENTION

Embodiments have been proposed in order to improve the performance of a mixture ratio stabilizer for a liquid propellant rocket engine.

In order to solve the above problems, there is provided a mixture ratio stabilizer for a liquid propellant rocket engine which comprises: a body internally having a chamber and a fuel supply hole communicating with an end of the chamber to receive fuel from a fuel supply pump, an oxidizer inlet communicating with the other end of the chamber to receive an oxidizer, and a fuel outlet communicated with the chamber to emit the fuel supplied; a spool guide in the chamber and including a plurality of first orifices for the fuel outlet and the fuel supply hole to communicate with each other; a bellows in the chamber and having one end adjacent to the spool guide and the other end positioned adjacent to the oxidizer inlet, to expand and contract in accordance with the pressure of an oxidizer which flows into the oxidizer inlet; and a spool having a part placed in the spool guide and the remaining part positioned in the bellows, one end connected with the bellows whereby it linearly reciprocates as the bellows expands and contracts, a fuel path provided for the spool and the bellows to communicate with each other, and a plurality of second orifices formed corresponding to the plurality of first orifices so that the fuel outlet and the fuel supply hole communicate with each other.

The communicating area of the first and second orifices may vary as the bellows expands and contracts, thereby regulating quantity of fuel discharged.

The mixture ratio stabilizer for a liquid propellant rocket engine may further comprise a spring provided in the bellows and having restoring force in the direction of which the bellows expands.

The mixture ratio stabilizer for a liquid propellant rocket engine may further comprise an attenuation regulator provided in the fuel path, wherein a third orifice is formed which has a smaller area than the fuel path to attenuate the expansion and contraction motion of the bellows.

DETAILED DESCRIPTION OF THE INVENTION

Hereinafter, embodiments will be described in detail with reference to the accompanying drawings.

Figure 1:
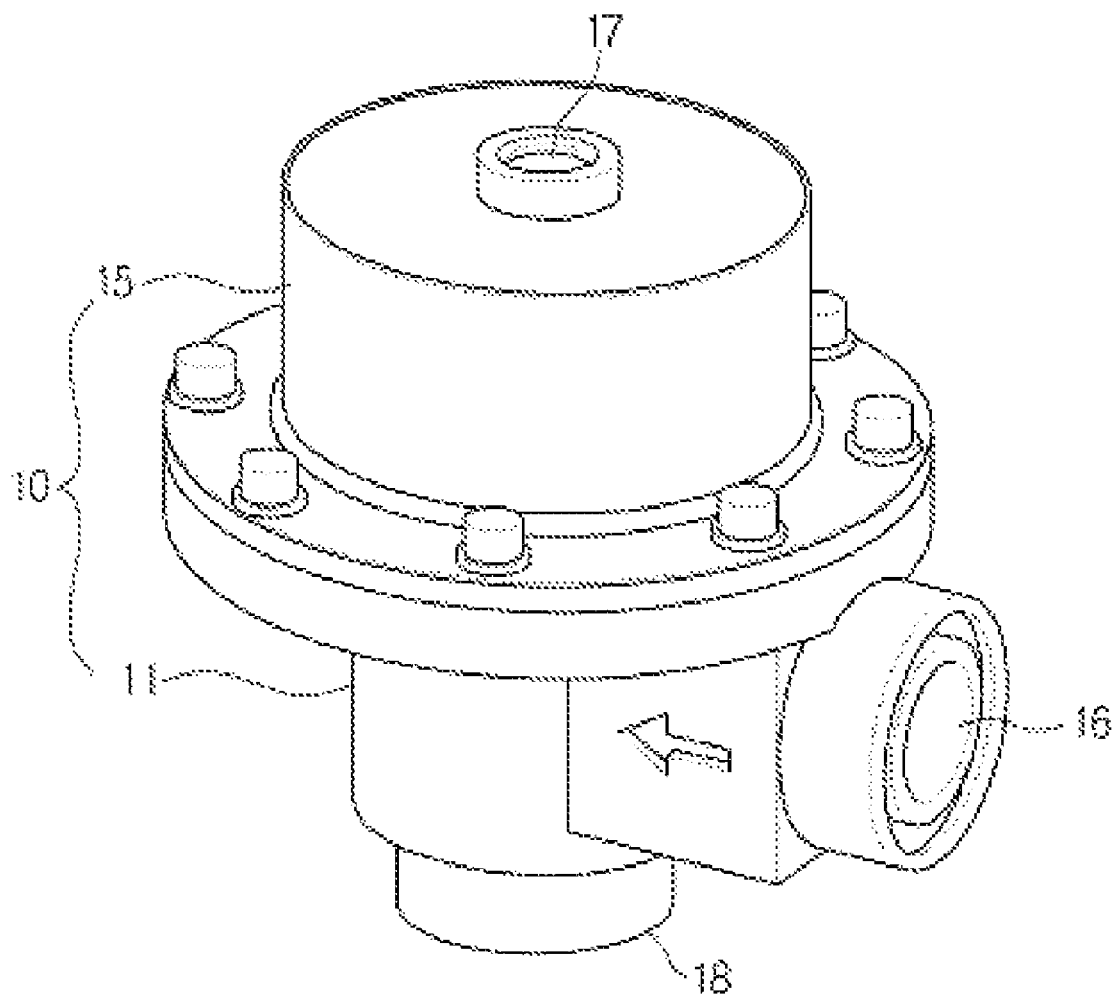
FIG. 1 is a perspective view illustrating a mixture ratio stabilizer for a liquid propellant rocket engine according to an exemplary embodiment.
Figure 2:
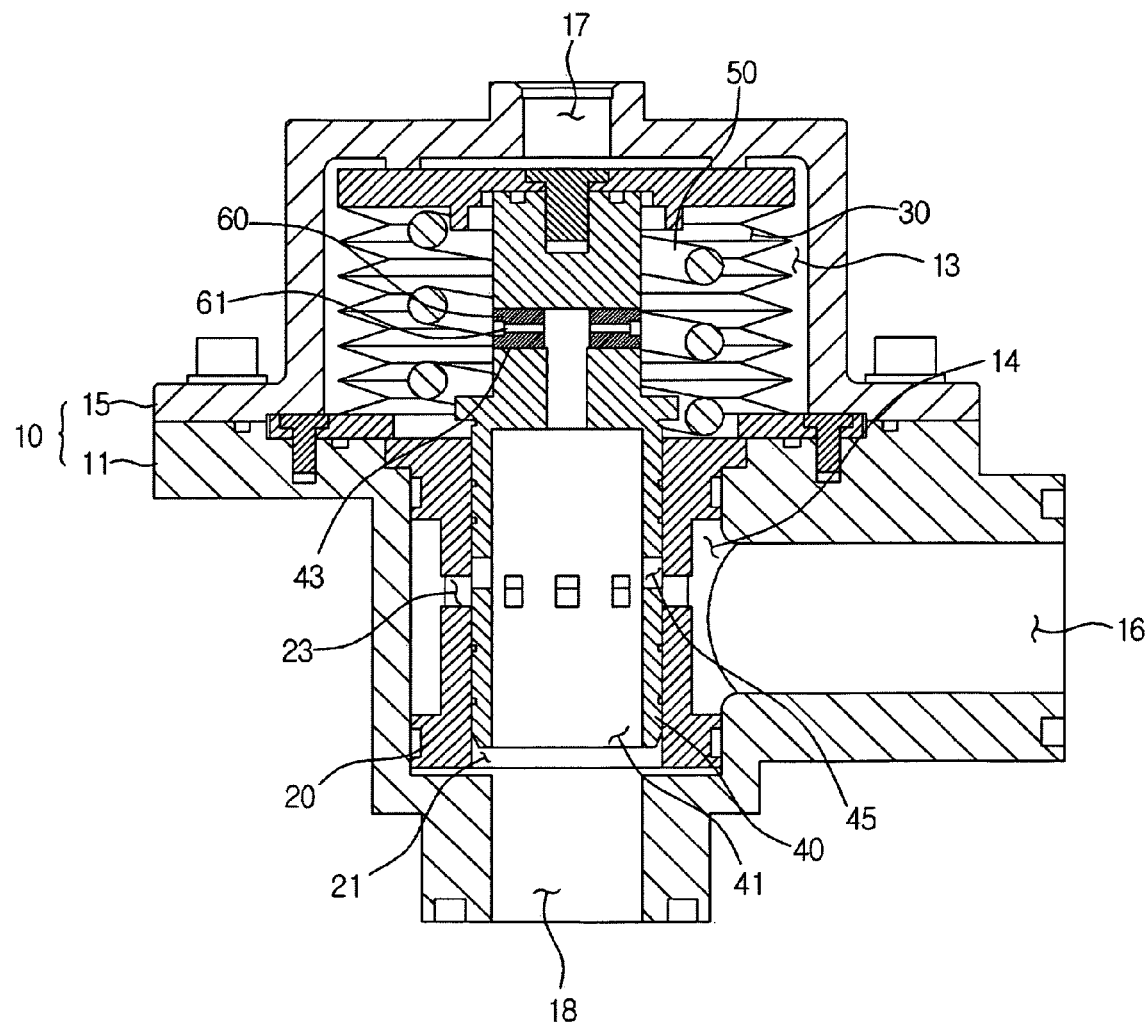
FIG. 2 is a sectional view illustrating first and second orifices of FIG. 1 are half closed.

As shown in FIG. 1 and FIG. 2, the mixture ratio stabilizer for a liquid propellant rocket engine according to the exemplary embodiment comprises a body 10, a spool guide 20, a bellows 30, and a spool 40.

Inside the body 10, there are formed chambers 13, 14 and a fuel supply hole (fuel inlet) 16 is connected with an end of the chamber 14 to receive fuel from a fuel supply pump. An oxidizer inlet 17 is provided, connecting with an end of the chamber 13 to which an oxidizer flows, and a fuel outlet 18 is connected with the chamber 14 to emit the supplied fuel.

According to the embodiment of the present invention, the body 10 is formed of a frame 11 and a cover 15, the frame 11 and the cover 15 having the second (fuel) chamber 14 and a first (oxidizer) chamber 13, respectively. Therefore, the fuel supply hole 16 and the fuel outlet 18 are respectively communicated with the second chamber 14 and the oxidizer inlet 17 communicates with the first chamber 13.

The spool guide 20 is formed inside the second chamber 14 and a first orifice 23 is provided so that the fuel outlet 18 communicates with the fuel supply hole 16.

According to the present embodiment, there may be formed a plurality of first orifices 23 depending on the circumference of the spool guide 20, and also the number of the first orifices 23 and the arrangement thereof may vary according to the embodiments.

The bellows 30 provided inside the first chamber 13 has one end adjacent to the spool guide 20 and the other end positioned adjacent to the oxidizer inlet 17 so that it expands and contracts up and down in accordance with the pressure of an oxidizer which flows into the oxidizer inlet 17.

Here, a spring 50 may be formed in the bellows 30, which has restoring force in the direction of which the bellows 30 expands and contracts.

A part of the spool 40 is placed in the spool guide 20 and the remaining part thereof is positioned in the bellows 30. One end of the spool 40 is connected with the bellows 30 whereby it linearly reciprocates as the bellows 30 expands and contracts, and a fuel path 43 is provided for the spool 40 and the bellows 30 to communicate with each other and a plurality of second orifices 45 are formed in the spool 40 corresponding to the plurality of first orifices 23 whereby the fuel outlet 18 and the fuel supply hole 16 communicate with each other.

According to the present embodiment, as the plurality of first orifices 23 are formed along the circumference of the spool guide 20, the plurality of the second orifices 45 are provided in the spool 40 corresponding to the first orifices 23.

Here, an attenuation regulator 60 may be formed in the fuel path 43 of the spool 40, and a third orifice 61 is formed in the attenuation regulator 60 to decrease the area of the fuel path 43, thereby attenuating of the expansion and contraction motion of the bellows 30.

Adjusting a diameter of the third orifice 61 may allow adjusting the attenuation of the expansion and contraction motion of the bellows 30.

Now, the operation of the mixture ratio stabilizer for a liquid propellant rocket engine according to an embodiment will be described.

Figure 3:
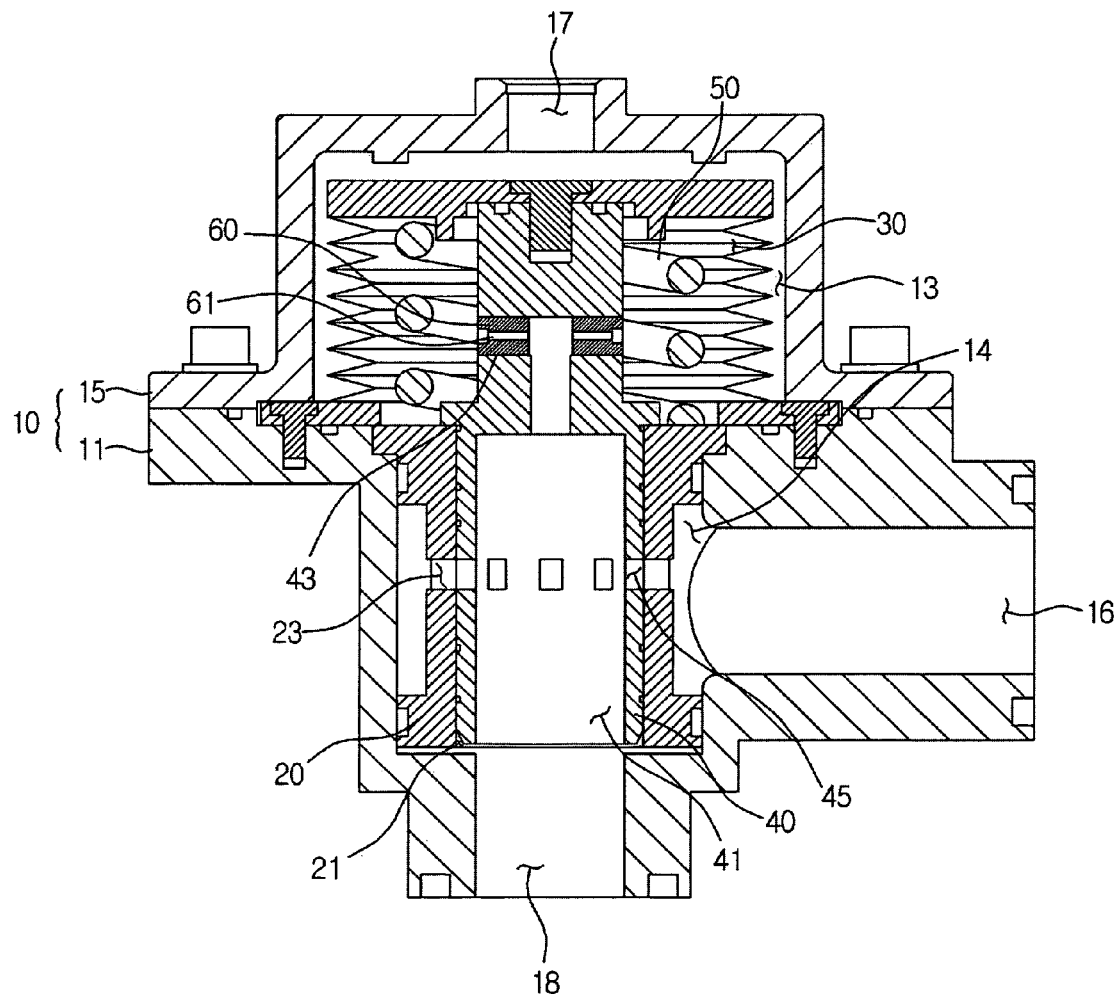
FIG. 3 is a sectional view illustrating first and second orifices of FIG. 1 are fully opened.
Figure 4:
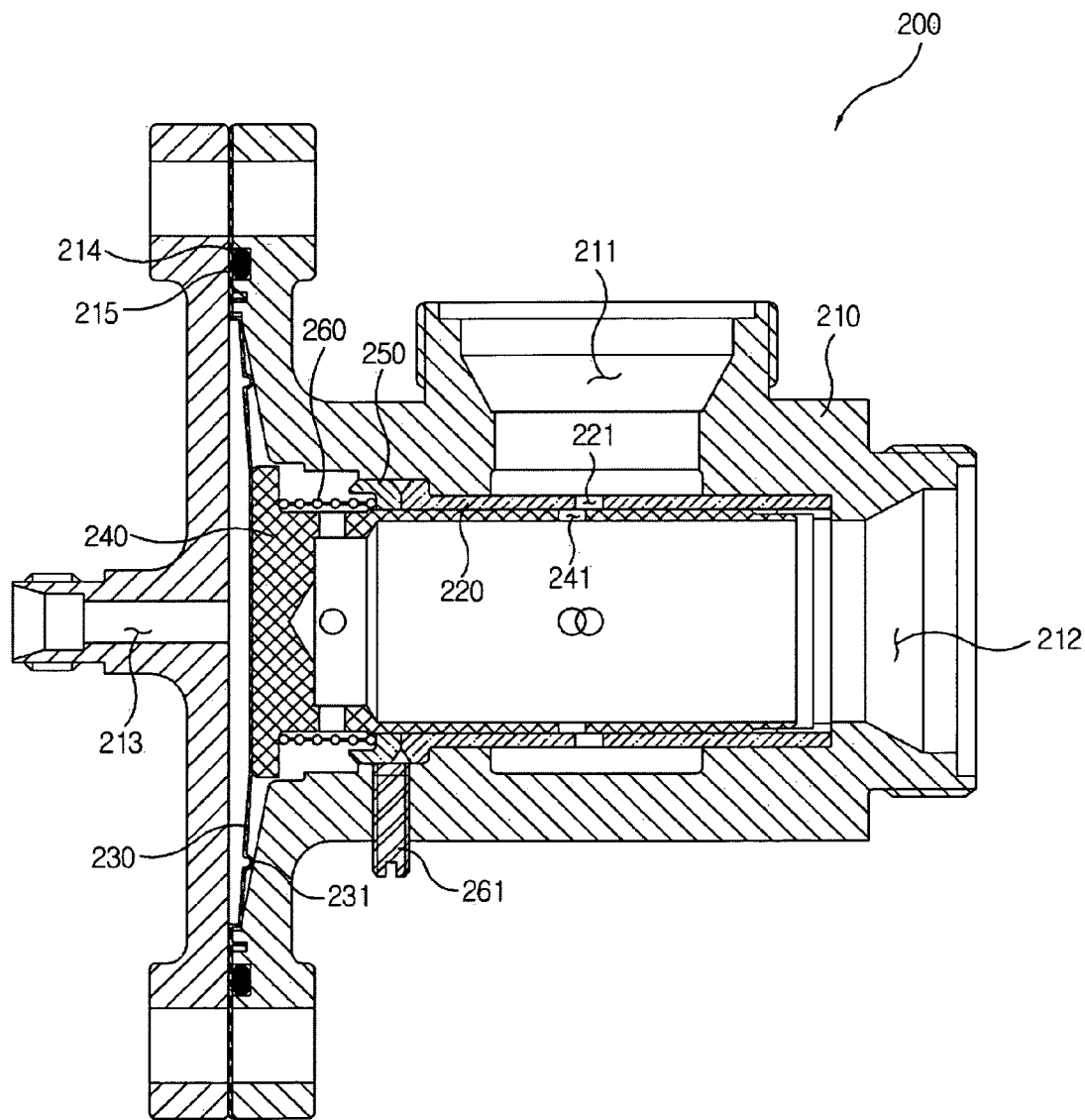
FIG. 4 is a sectional view which shows a conventional mixture ratio stabilizer.

When oxidizer flows in through the oxidizer inlet 17, the bellows 30 starts contracting caused by the pressure of the oxidizer. The contraction motion of the bellows 30 pushes the spool 40 downwards and accordingly the communicating area of the first and second orifices 23, 24 becomes larger as shown in FIG. 3.

As described above, when the communicating area of the first and second orifices 23, 45 increases in size, the quantity of flow of the fuel supplied through the fuel supply hole 16 also increases, thereby increasing the quantity of the fuel to be discharged to the fuel outlet 18.

Here, as the bellows 30 contracts, the fuel filled in the bellows 30 moves into the spool 40 through the third orifice 61.

On the other hand, when the pressure changes instantaneously caused by the oxidizer which flows in through the oxidizer inlet 17 and thus the bellows 30 contracts, the spool 40 is pushed downwards and therefore the quantity of the fuel discharged through the fuel outlet 18 increases abruptly, which leads the rocket engine to be very unstable.

To provide against the case, the attenuation regulator 60 may be formed in the fuel path 43 and it has the third orifice 61 which has a smaller area than the fuel path 43. Accordingly, it is difficult for the fuel in the bellows 30 to pass through the third orifice 61, thereby preventing the bellows 30 from abruptly shrinking.

Since the attenuation regulator 60 is provided in the fuel path 43 to prevent the sudden contraction of the bellows 30 and attenuate the operation of the bellows 30, it is possible to cope with the disturbances such as transient responses, sudden change in pressure, etc., thereby improving the stability of the rocket engine and promptly removing vibration of the spool 40.

As the pressure of the oxidizer which flows through the oxidizer inlet 17 is low, the bellows 30 becomes expanded by the restoring force of the spring 50 and the spool 40 connected with the bellows 30 moves upwards.

Here, as shown in FIG. 2, since the communicating area of the first and second orifices 23, 45 decreases in size and therefore the quantity of flow of the fuel supplied through the fuel supply hole 16 decreases, the quantity of the fuel discharged to the fuel outlet 18 falls accordingly.

As described above, the expansion and contraction of the bellows 30 varies the communicating area of the first and second orifices 23, 45, thereby regulating the fuel flow rate and therefore maintaining the mixture ratio of the propellant of the liquid propellant rocket engine at a fixed rate.

The mixture ratio stabilizer for a liquid propellant rocket engine according to the embodiment of the present invention has the following effects.

First, using the bellows is more economical since it is able to decrease the size and weight of the mixture ratio stabilizer.

Second, since the attenuation regulator is provided in the fuel path to attenuate the operation of the bellows and the operation speed of the spool decreases, it is possible to manage the disturbances such as transient responses, sudden change in pressure, etc., thereby increasing the stability of the rocket engine and promptly removing vibration of the spool.

It will be apparent to those skilled in the art that various modifications and variations can be made to embodiments without departing from the spirit or scope of the disclosed embodiments. Thus, it is intended that the present invention covers modifications and variations of this invention provided they come within the scope of the appended claims and their equivalents.

What is claimed is:

1. A mixture ratio stabilizer for a liquid propellant rocket engine, comprising:
   a body having:
      a fuel chamber;
      an oxidizer chamber;
      a fuel inlet communicating with the fuel chamber to receive fuel from a fuel supply pump;
      an oxidizer inlet communicating with the oxidizer chamber to receive an oxidizer; and
      a fuel outlet communicating with the fuel chamber to emit the fuel supplied;
   a spool guide disposed in the fuel chamber and including a plurality of first orifices for the fuel outlet and the fuel inlet to communicate with each other;
   a bellows disposed in the oxidizer chamber and having one end adjacent to the spool guide and another end positioned adjacent to the oxidizer inlet, said bellows expanding and contracting in accordance with a pressure of the oxidizer which flows into the oxidizer inlet; and
   a spool having a part placed in the spool guide and a further part positioned in the bellows, one end of the spool being connected with the bellows whereby the spool linearly reciprocates as the bellows expands and contracts, the spool having a fuel path, including a third orifice, that communicates with a cavity in the bellows, and the fuel outlet, the spool further having a plurality of second orifices formed to correspond to the plurality of first orifices so that the fuel outlet and the fuel inlet communicate with each other.

2. The mixture ratio stabilizer for a liquid propellant rocket engine of claim 1, wherein a communicating area of the first and second orifices varies as the bellows expands and contracts, thereby regulating a quantity of fuel to be discharged.

3. The mixture ratio stabilizer for a liquid propellant rocket engine of claim 2, further comprising:
   a spring which is provided in the bellows and has a restoring force in a direction of which the bellows expands.

4. The mixture ratio stabilizer for a liquid propellant rocket engine of claim 2, further comprising:
   an attenuation regulator which is formed in the fuel path, wherein the third orifice is formed in the attenuation regulator, the third orifice having a smaller area than the fuel path to attenuate an expansion and contraction motion of the bellows.

5. The mixture ratio stabilizer for a liquid propellant rocket engine of claim 1, further comprising:

a spring which is provided in the bellows and has a restoring force in a direction of which the bellows expands.

6. The mixture ratio stabilizer for a liquid propellant rocket engine of claim 1, further comprising:

an attenuation regulator which is formed in the fuel path, wherein the third orifice is formed in the attenuation regulator, the third orifice having a smaller area than the fuel path to attenuate an expansion and contraction motion of the bellows.

\* \* \* \* \*